July 31, 1951     E. E. PRATHER     2,562,366
TRANSMISSION OPERATING MECHANISM
Filed Feb. 7, 1949     3 Sheets-Sheet 1
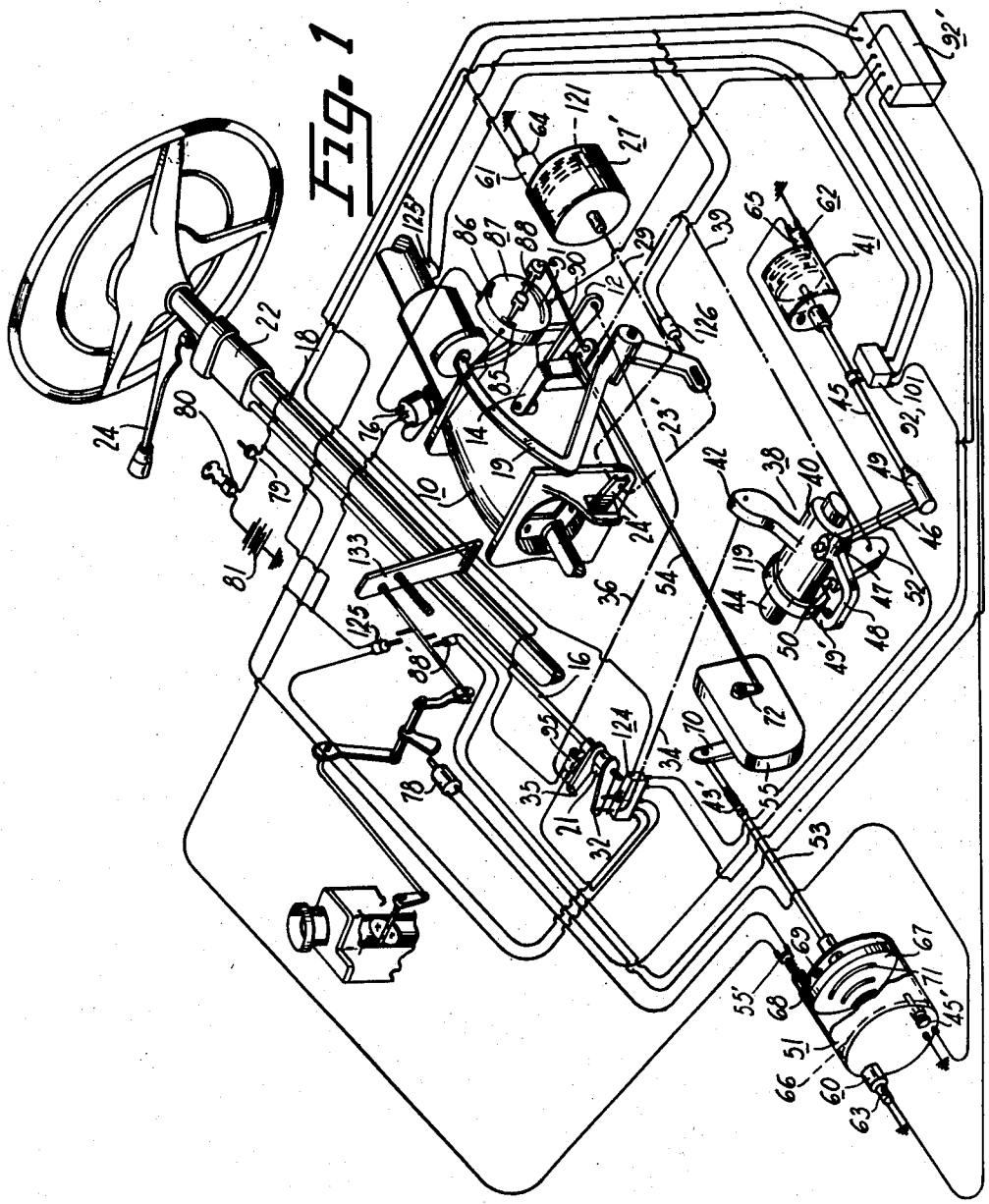
INVENTOR
BY EDWIN E. PRATHER
ATTORNEY

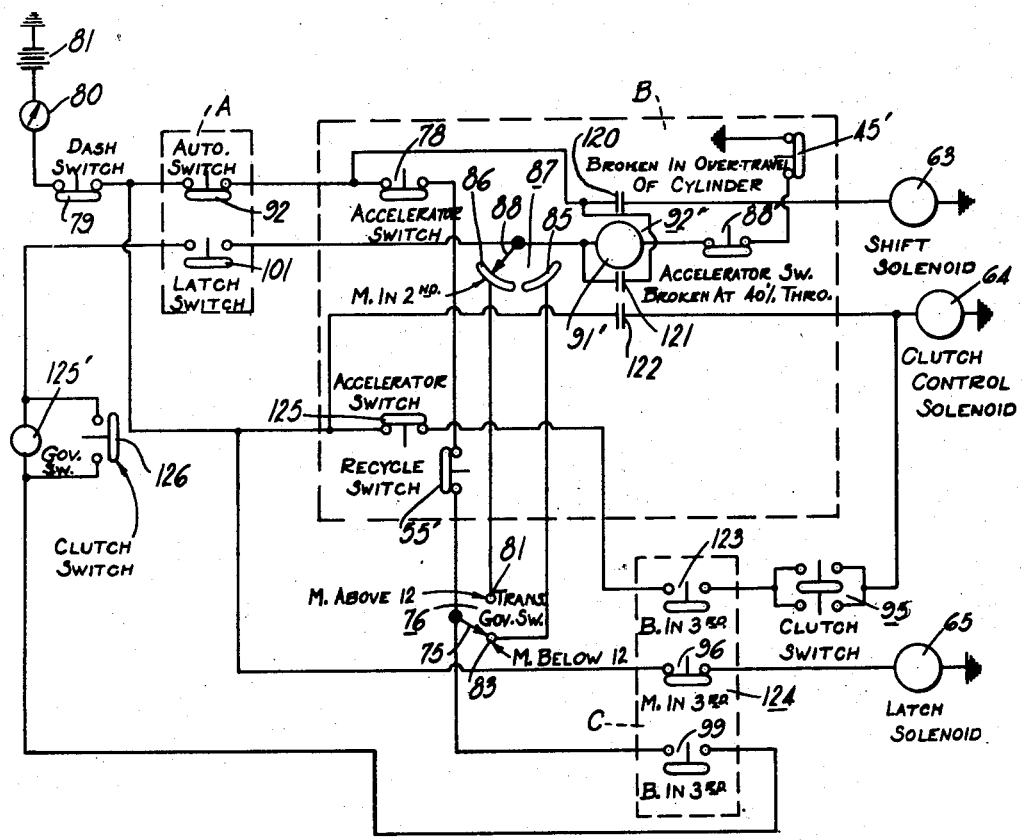

July 31, 1951     E. E. PRATHER     2,562,366

TRANSMISSION OPERATING MECHANISM

Filed Feb. 7, 1949     3 Sheets-Sheet 3

INVENTOR
BY *Edwin E. Prather*
*J. O. Clayton*
ATTORNEY

Patented July 31, 1951

2,562,366

UNITED STATES PATENT OFFICE 2,562,366

TRANSMISSION OPERATING MECHANISM

Edwin E. Prather, South Bend, Ind., assignor to Bendix Aviation Corporation, South Bend, Ind., a corporation of Delaware Application February 7, 1949, Serial No. 74,930

14 Claims. (Cl. 192—.073)

1

This invention relates in general to the power transmission mechanism of the power plant of an automotive vehicle and in particular to power and manually operated means for operating the change speed transmission of said power plant and for operating the friction clutch to facilitate the operation of the transmission.

One of the objects of my invention is to provide, in an automotive vehicle including a three speeds forward and reverse transmission, a simple mechanism, power operated in part, for operating said transmission, all of the settings thereof being effected by a manual operation of said mechanism if the driver desires to so operate the mechanism, and the second and high gear settings of the transmission being effected by power means if the driver elects this operation of the mechanism the latter operation being facilitated by a power operation of the friction clutch.

A further object of my invention is to provide, in an automotive vehicle including a power plant comprising an accelerator, a friction clutch, a three speeds forward and reverse transmission, and a gear shift lever; means for operating and for facilitating the operation of said transmission, said means including power means, comprising a plurality of single acting motors, which are automatically operable, after the shift lever is placed in its high gear position and the accelerator is released, to establish the transmission either in its second gear setting or its high gear setting, depending upon the speed of the vehicle, the friction clutch being operated by one of said motors to facilitate this operation of the transmission, said means further including manually operated means for effecting, at any time, any one of the gear settings of the transmission.

A further object of my invention is to provide, in the power plant of an automative vehicle including a three speeds forward and reverse transmission, a friction clutch and a gear shift lever, a manually and power operated mechanism for operating the transmission and friction clutch said mechanism being capable of a manual operation to operate the transmission and also capable, when the accelerator is released and the shift lever is placed in its high gear position, of effecting a power operation of the transmission to alternately effect the high gear and second gear settings thereof, the friction clutch being disengaged to facilitate each of said poerations and automatically re-engaged after each operation is completed; and another object of my invention is to include, in such a mechanism, means

2 for disconnecting the shaft lever from the transmission when the latter is being power operated.

Yet another object of my invention is to provide, in the power plant of an automotive vehicle including a three speeds forward and reverse transmission, a friction clutch and a transmission operating gear shift lever, a manually and power operated mechanism for operating the transmission and clutch, said mechanism including a shift lever operated linkage for manually operating the transmission, power means for operating the transmission to alternately establish the same in the high and second gear settings and for operating the clutch to facilitate said operations of the transmission, and power means, including a latch mechanism, operable when the shift lever is placed in its high gear position, to render the first mentioned power means operative and to disconnect portions of the force transmitting linkage to thereby render the shift lever immobile when the transmission is being power operated; and a further object of my invention is to provide means for so controlling the first mentioned power means as to expedite an operation of the mechanism to make possible a resumption of the manual operation of the transmission when it is desired to discontinue the power operation thereof.

A further object of my invention is to provide, in the power plant of an automotive vehicle including a three speeds forward and reverse transmission, a friction clutch and a transmission operating gear shift lever, a manually and power operated mechanism for operating the transmission and clutch, said mechanism including a shift lever operated linkage for manually operating the transmission, a shift lever operated control means for effecting a power operation of the clutch when the transmission is being manually operated, power means, including a hold-down relay mechanism, for operating the transmission to alternately establish the same in its second and high gear settings and for operating the clutch to facilitate said power operation of the said transmission, and other power means, including a spring and pressure differential operated motor operable, when the shift lever is placed in its high gear setting to render the first mentioned power means operative and to immobilize the gear shift lever, said spring and pressure differential operated power motor also serving, by a spring operation thereof and after the shift lever is moved out of its high gear position, to so operate the first mentioned power means as to facilitate the resumption of the manual operation of the transmission.

The above and other objects and features of the invention, including the compacting of the controls of the mechanism in a minimum of containers thereby facilitating the servicing of the mechanism, will appear more fully hereinafter from a consideration of the following description taken in connection with the accompanying drawings wherein one embodiment of the invention is illustrated by way of example.

Figure 1 is a diagrammatic view of my invention disclosing the principal features thereof;

Figure 2 is a wiring diagram of the electrical mechanism disclosed in Figure 1;

Figure 8:
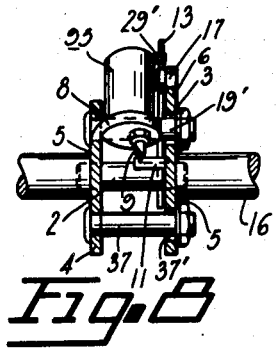
Figure 7:
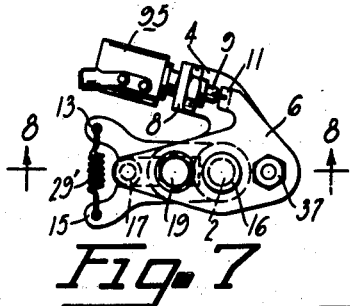
Figure 6:
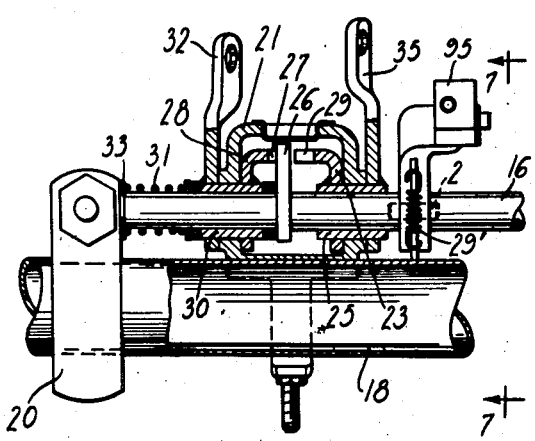

Figure 6 is a view, largely in section, disclosing details of a part of the linkage interconnecting the shift lever with the change speed transmission and also disclosing the shift lever operated clutch control switch of my invention; and Figure 7 is a view, taken on the line 7—7 of Figure 6, disclosing the manually operated clutch control switch of my invention and the switch lever operated mechanism for operating said switch; and Figure 8 is a sectional view taken on the lines 8—8 of Figure 7, disclosing details of the switch operating mechanism of Figure 7.

Referring now to Figure 1 disclosing a preferred embodiment of my invention, a three speeds forward and reverse transmission 10 is operated by means of a manually operated crank 12 and a manually and power operated crank 14, the crank 12 serving to operate the transmission to establish the same in either its low gear setting or its reverse gear setting and the crank 14 serving to operate that part of the transmission functioning to establish the same in either its second gear setting or the third gear setting. The linkage for actuating the cranks 12 and 14 is disclosed in Figures 1 and 6 and includes a two part rod 16 extending alongside the steering post 18 of the vehicle and secured to said post by brackets 20, 21, and 22. The rod 16 is moved bodily upwardly and downwardly along the steering post by a manually operable gear shift lever 24 and said rod is rotated about its axis by an angular movement of said lever. A pin 26 is secured to the rod 16 and the latter is biased downwardly by a spring 31 so that the pin is moved into engagement with a slot 27 in a flange 28 fixedly secured to a sleeve 30 rotatably mounted on said rod; and a crank member 32 is fixedly secured to the sleeve 30 so that rotation of the rod when the pin is in engagement with a slot 27, will result in a rotation of the crank 32.

Upward movement of the rod 16, in the operation of effecting either a reverse gear or low gear operation of the transmission, serves to nest the upper end of the pin 26 within a slot 29 in a flange 23 fixedly secured to a sleeve 25 rotatably mounted on said rod; and a crank 35 is fixedly secured to the sleeve 25 said crank being rotated when the rod is rotated, the pin 26 at the time being nested within the slot 29. The flanges 23 and 28 and the pin 26 are housed within the support bracket 21 thereby protecting this mechanism from the elements; and the spring 31, which serves to bias the pin 26 into engagement with the flange 28 preparatory to effecting either a second gear or high gear operation of the transmission, is interposed between the sleeve 30 and a flange 33 secured to the rod 16.

My invention has to do with the manually and power operated means for actuating the transmission and for operating a conventional friction clutch, not shown, said clutch preferably including the usual driving and driven clutch plates forced into engagement by the operation of clutch springs and centrifugal weights. The transmission and clutch may be of conventional design; accordingly, no claim is made thereto and the same are not disclosed in the drawings. The clutch is operably connected to the clutch pedal 19 of the car by a means including a crank 24' and a rod 23', the connection between the clutch pedal and the rod being of the lost motion type to make possible a power operation of the clutch without moving the clutch pedal. As to this power operation of the clutch this is effected by a single acting pressure differential operated motor 27' operably connected to the crank 24' by a rod 29.

Describing now the connection between the cranks 32 and 35 and the transmission operating cranks 14 and 12, the latter crank, which is actuated to establish the transmission in either its low gear setting or its reverse gear setting, is connected to the crank 35 by a connection 36 and the crank 14, which is actuated to establish the transmission in either its second gear setting or its high gear setting, is connected to the crank 32 by connections 34 and 39 and a latch mechanism indicated as a whole in Figure 1 by the numeral 38. This latch mechanism includes a cylinder 40 secured to the connection 34 by a crank 42 said cylinder being rotatably mounted on a support shaft 44. A lever 46 is pivotally secured at its hub portion 47 to the body of the cylinder member 40. One end portion 48 of the lever 46 constitutes a latch member adapted to nest within a recess 50 in a crank 52 rotatably mounted on the shaft 44; and the connection 39 is secured to one end of said crank. The latch member 46 is preferably operated by a single acting pressure differential operated motor 41 the power element 43 of which is connected to the lever 46 by a rod 45; and the connection between the rod 45 and said lever preferably includes a universal joint 49. With the car at rest, the engine idling, and the shift lever in its third gear, that is automatic position, the parts of the latch mechanism assume the positions disclosed in Figure 1.

The transmission is preferably power operated to alternately establish the second gear setting and the third gear setting and to this end there is provided a single acting pressure differential operated motor 51 operably connected to the crank 14 by rods 53 and 54 which are interconnected by an alternator or often called direction changing mechanism 55. This alternator mechanism, which may be of the type disclosed in the U. S. patent application of Earl R. Price, No. 779,164, is not disclosed in detail in this application inasmuch as the same constitutes, of itself, no part of my invention. Suffice it to say that successive operations of the motor 51 will effect a reciprocatory movement of the rod 54 to actuate the crank 14 to alternately establish the transmission in its second and high gear settings.

Describing now the means for controlling the operation of the transmission operating motor 51, the clutch operating motor 27', and the latch operating motor 41, each of said motors is preferably controlled by a three way valve said valves being indicated, respectively, by the reference numerals 60, 61, and 62; and said valves are actuated, respectively, by grounded solenoids 63, 64, and 65 disclosed diagrammatically in Figures 1 and 2. Describing the operation of the valve 60, which description will suffice for valves 61 and 62 inasmuch as the three mechanisms are identical, when the solenoid 63 is energized the valve 60 is opened to interconnect a control compartment 66 of the motor 51 with a source of suction, not shown, preferably the intake manifold of internal combustion engine of the vehicle. A compartment 66 is thus partially evacuated and a power element 67 of the motor is then subjected to a difference of pressures inasmuch as one side of the element 67 is exposed to the atmosphere which is admitted to a compartment 68 of the motor via an opening 69. The power element 67 is thus moved to the left, Figure 1, to actuate a power input crank 70 of the alternator 55; and this operation serves to actuate a power output crank 72 of the alternator to actuate the transmission operating crank 14 to operate the transmission. Completing the description of the three way valve 60 when the solenoid 63 is de-energized a spring, not shown, serves to close the valve thereby venting the compartment 66 to the atmosphere. The return spring 71 within the compartment 66 then expands to move the power element 67 to the right thereby operating the alternator 55 to prepare for a subsequent actuation of the crank 72 to again operate the transmission 10.

Figure 5:
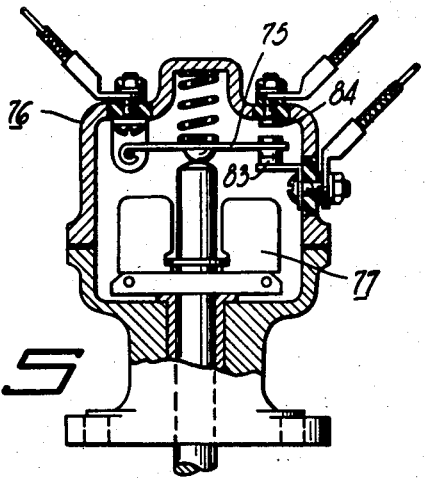
Figure 5 is a sectional view disclosing details of one of the governor operated switch mechanisms of my invention.

The electrical means for controlling the operation of the solenoids 62, 63, and 64 constitute one of the important features of my invention said electrical means being disclosed in Figures 1 and 2, particularly the latter figure. Describing this control means the movable contact 75 of a single pole double throw switch 76, Figure 5, operated by a vehicle speed responsive centrifugally operated governor 77, is electrically connected in series with a normally open breaker switch 55', an accelerator operated breaker switch 78, a breaker switch 92, defined as the automatic switch, a dash mounted manually operated cutout switch 79 of the breaker type, the ignition switch 80 of the car and a grounded battery 81. No claim is made to the breaker switches 92, 78, 55', and 79 for the same include the usual fixed contact and a spring operated movable contact the spring being overcome to close or open the switch depending upon whether said switch is normally open or normally closed. A switch 75, 83 of the switch 76 is closed, to effect a low gear operation of the transmission, when the vehicle is at a standstill or is travelling below a certain speed; and a switch 75, 84 of the switch 76 is closed, to effect a high gear setting of the transmission, when the vehicle is travelling at or above the aforementioned speed, that is, above governor speed. The normally open switch 55' is preferably mounted on the motor 51 as is disclosed in Figure 1; and said switch is closed by the piston 67 when said piston is in its released, that is, clutch engaged position.

The fixed contacts 83 and 84 of the governor operated switch 76 are electrically connected, respectively, to fixed contacts 85 and 86 of a selector switch 87 operated by the motor operated transmission operated crank 14; and to one end of the movable contact 88 of the latter switch mechanism there is pivotally connected a link 90 which is pivotally connected to the crank 14. The movable contact 88 is electrically connected to a grounded breaker switch 45' by electrical means including a conductor plate 91, Figure 1, of the switch 87, the coil 91' of a lock-in relay mechanism 92', and an accelerator operated breaker switch 88', described hereinafter, which is closed when the accelerator is released or is just short of its released position, and which is broken at or about its 40 per cent throttle travel position. The breaker switch 45', which is normally closed, is opened, by a movement of the piston 67, immediately after the transmission is established in gear. A tension spring 43', incorporated in the rod 53, makes the latter switch operation possible.

As is disclosed in Figure 2 the lock-in relay switch mechanism 92' includes normally open switches 120, 121, and 122; and as will be noted from an inspection of this figure when the relay coil 91' is energized these three switches are closed. It follows that a de-energization of the coil 91' automatically results in an opening of the latter switches. The switch 120, which may be defined as a load control switch, serves to control the shift motor controlling solenoid 63; the switch 121, by virtue of its being included in an electrical circuit which shunts the switches 55', 76, 78, and 87, serves to insure an energization of the coil 91' to complete an operation of the motor 51 once initiated; and the switch 122 serves to control the clutch controlling solenoid 64. The switch 121 of the relay 92' may be defined as a lock-in switch inasmuch as when the circuit including said switch is closed the coil 91' remains energized thereby maintaining the control switch 120 closed to keep the solenoid 63 energized despite an opening of the accelerator switch 78. It is apparent therefore that the lock-in relay 92' helps to insure a completion of the operation of the shifter motor 51 despite an opening of the accelerator operated switch 78 as said motor is performing its operation.

Figure 4:
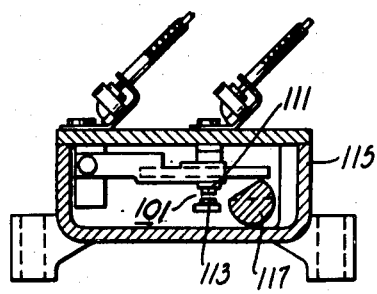
Figure 4 is a sectional view, taken on the line 4—4 of Figure 3, disclosing details of the switch mechanism of said figure the latch switch being shown in its open position as a result of the energization of the motor 41.
Figure 3:
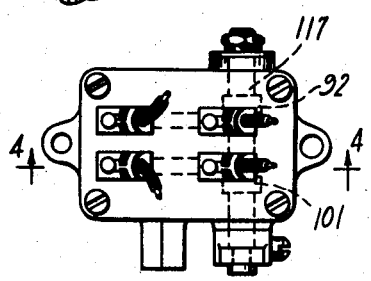
Figure 3 is a plan view of the latch motor operated latch switch and automatic switch mechanism of my invention.

The breaker switch 92, Figures 3 and 4, including a movable contact 111 and a fixed contact 113, is housed within a casing 115 the contact 111 being moved out of contact with the contact 113 by a cam shaft 117 connected to the motor operated shaft 45; and a latch switch 101 duplicating the switch 92 is also operated by the cam shaft 117. The parts of the mechanism, including the shape of the cam faces on the shaft 117 and the connection between the shaft 45 and the shaft 117, are so constructed and arranged and so operative that the switch 92 is closed and the switch 101 is opened when the motor 41 is vacuum energized. The latch member 48 is then completely clear of the recess 50. The parts of the mechanism are also so constructed and arranged that with a movement of the piston 67 by the spring 71, that is, an operation resulting from a de-energization of the motor 51, the switch 101 is made at the same or substantially the same time the latch member 48 is entering the recess 50 or when said member contacts or is about to contact the face member 119 of the crank 52; and the switch 92 remains closed during this operation of the switch 101. Continued spring operated movement of the piston 67 results in a continued clockwise movement of the crank shaft 117 to effect a simultaneous or substantially simultaneous opening of the switches 92 and 101 this operation taking place shortly after the latch face 49' enters the recess 50.

As to the control of the clutch control valve 61 the solenoid 64 for operating said valve is electrically connected directly to the switch 122 of the lock-in relay 92' thereby insuring an operation of the clutch motor 27' to disengage the clutch when the motor 51 is energized to operate the transmission. As another feature of my invention there is provided a separate electrical control means for the clutch motor 27'. This control means includes a switch 95 actuated by the gear shift leaver 24 to close said switch whenever the shift lever 24 is moved to operate the transmission. As is disclosed in Figure 2 this switch 95 constitutes a part of the electrical circuit directly interconnecting an accelerator operated breaker switch 125, the dash mounted breaker switch 79, and the clutch controlling solenoid 64; and in series in this circuit there is also included a normally closed shift lever operated breaker switch 123 which is broken when the shift lever is moved to its high gear position. The switch 123 is part of a three pole single throw switch unit 124 of standard design said switch unit being referred to hereinafter. There is thus provided means for disengaging the clutch by the motor 27' irrespective of whether or not said motor is operable incidental to the operation of the transmission by the motor 51. In other words with the switches 123, 79, 80, 95, and 123 closed the clutch is power operated to facilitate a manual operation of the transmission to establish any one of its settings.

The switch 95 and the mechanism for operating the same is disclosed in detail in Figures 6, 7, and 8 and includes a relatively short pin 2 serving as a means for aligning spaced apart sections of the shift lever operated rod 16. As is disclosed in Figure 8 the ends of the pin 2 are seated within recesses in the adjacent parts of the rod 16. A two-armed crank 4 is fixedly secured, as by welds 5, to the upper end of the lower part of the two part rod 16; and a two-armed crank 6 is fixedly secured to the lower end of the upper part of said rod. Posts 19' and 37, fixedly secured to the crank 4, extend respectively through openings 3 and 37' in the crank 6. The crank 4 is preferably provided with a tab portion 8 struck out of the body of the crank. The breaker switch 95 is secured to the tab 8 and said switch is actuated in part by a pin 9 extending within the body of the switch housing. Briefly describing the construction of the switch 95 the pin 9 is biased, by spring means within the switch, to its switch open position said position of the pin being disclosed in Figure 8. The pin 9 is connected by a tab 11 extending from the crank 6; and the switch is so constructed that the same is closed either when the tab 11 is moved in either direction, Figure 7.

Describing now the mechanism for actuating the switch operating tab 11, pawls 13 and 15, rotatably mounted at their lower ends upon the pin 2, are biased toward each other into contact with a pin 17 by means of a spring 29' said spring being connected to the upper ends of the pawls. The pin 17 is fixedly secured to the upper end of the crank 6. Incidentally no claim is made to the switch 95 per se or to the above described mechanism for operating said switch.

Describing now the operation of the switch 95 the same is closed when the driver of the vehicle rotates the shift lever 24 in a plane parallel or substantially parallel to the plane of said lever to effect a manual operation of the transmission; and with this operation the crank 6 is rotated in one direction or the other. Describing this switch closing operation in greater detail the lower section of the two part rod 16 and the crank 4 secured thereto remain stationary as the crank 6 is rotated to close the switch this operation being effected by virtue of the fact that less force is required to expand the spring means, not shown, within the switch than is required to rotate the crank 4. In effecting this closing operation of the switch 95 the crank 6 is rotated around the pin 2 as a fulcrum said rotation being made possible by virtue of the lost motion provided by the movement of the posts 19' and 37 within the openings 3 and 37' respectively. The closing of the switch 95 then initiates an operation of the motor 27' to disengage the clutch thereby disconnecting the engine from the transmission said operation being defined as a torque reversal operation of the power plant of the vehicle; and immediately after the latter operation is completed there is initiated a rotation of all of the parts of the mechanism of Figure 8 as a unit with a resulting operation of the transmission. Then after the operation of the transmission is completed the driver will remove his hand from the shift lever thereby permitting the spring 29' to return the pawls 13 and 15 in position against the pin 17 and permitting the spring means within the switch to center the posts 19' and 37 in the openings 3 and 37' and to open the switch 95.

There is thus provided by the switch 95 and the means for operating the same, means for controlling the operation of the clutch by an operation of the shift lever the clutch being disengaged prior to an operation of the transmission and automatically re-engaged when the driver removes his hand from the shift lever. It is also to be noted that the shift operating mechanism of Figures 6, 7, and 8 is not operative to effect an operation of the clutch when the shift lever is actuated to effect what is known as a cross shift operation of the transmission, that is an upward bodily movement of the rod 16 preliminary to effecting an operation of the low and reverse gear operating crank 35, Figure 6.

One of the features of my invention lies in the means, operable at the will of the driver of the vehicle, for either completely operating the transmission by the physical effort of the driver or effecting the second and high gear settings of the transmission by the operation of the power means the gear shift lever remaining immobile during the latter operation. A part of the mechanism for effecting this control has been described above, that is, the latch mechanism 38, the latch motor 41 for operating the latch mechanism and the electrical means for controlling the solenoids 63 and 64. As to the means for controlling the latch motor 41 the solenoid 65 which operates the three way valve 62, is controlled by a switch 96 constituting one of the three switches of the aforementioned three pole single throw switch 124 said switch being actuated by the second and high gear operating crank 32, Figure 1. The remaining switch of the switch mechanism 124 is indicated by the reference numeral 99 and is referred to hereinafter.

Assuming that the driver desires a second and high gear power operation of the transmission he will place the shift lever 24 in its high gear position and this operation serves to close the switch 96 and open the switch 99 the switch 96 being closed when the shift lever is in its high gear position and open when said lever is in all other positions. The switch 99 is broken when the shift lever is in its high gear position and open in all other positions of said lever.

The driver will then close the switch 79 and release the accelerator to close the switch 78 whereupon the solenoid 65 is energized to open the valve 62 to thereby energize the latch motor 41. The latter operation serves to rotate the latch lever 46 in a counterclockwise direction, Figure 1, thereby moving the latch 48 out of the recess 50 to disconnect the shift lever from the transmission operating crank 14. The switch 92 is closed during this operation of the mechanism and as will be noted from an inspection of Figure 2 of the drawing the closing of the switch 92 completes the electrical circuit to effect an energization of the coil 91' of the relay 92'; and the latter operation results in an energization of the shift motor controlling solenoid 63.

It is apparent therefore that when the driver wishes to effect a power operation of the transmission he need but close the switches 78 and 79 and then move shift lever to place the transmission in its high gear setting. This operation of the shift lever closes the switch 95 to effect an operation of the motor 27' to disengage the clutch and also effects an energization of the latch motor 41 the latter operation serving, by virtue of an operation of the latch 38, to disconnect the shift lever from the transmission to render said lever immobile and at the same or substantially the same time, by the closing of the switch 92, render the power means operative to operate the transmission. It is assumed of course that the engine is at the time operating to provide a source of vacuum to energize the motors 27', 41 and 51; and to effect an operation of the engine it is of course necessary to close the ignition switch 80 which incidentally constitutes one of the electrical controls for controlling the shift motor controlling solenoid 63.

Now with the above described operation of the mechanism the transmission is power operated to establish its second gear setting assuming that the shift lever had been manually operated to move the same to its high gear setting to close the switch 96 and that the car is at a standstill or is traveling below governor speed, that is the speed resulting in a closing of the switch 75, 83, Figure 2. More completely describing this operation of the mechanism it will be remembered that when the transmission is manually operated from its second gear setting to establish the same in its high gear setting that in the latter setting the parts of the latch mechanism 38 assume their locked positions. The switch 79 is then closed whereupon the latch motor 41 is energized to move the latch 48 out of the recess 50; and the resultant closing of the switch 92 effects a power operated second gear setting of the transmission, the shift lever and parts connected thereto being rendered immobile by an operation of the latch operating motor 41.

Continuing the description of the operation of the mechanism of my invention as the transmission is being power operated to establish the same in its second gear setting the switch 88, 93, Figure 2, is opened, the switch 86, 88 is closed, and the switch 45' is opened thereby automatically de-energizing the motor 51. As explained above however the switch 45' does not, by virtue of the operation of the spring 43', open until a very short period of time after the gears are completely in mesh. The motor spring 71 then expands to preselect the altenator 55 for a subsequent high gear operation of the transmission; and a return spring 121 of the clutch motor 27' expands to reengage the clutch of the vehicle.

The driver will then depress the accelerator to speed up the engine to get the vehicle under way in second gear and when a certain vehicle speed is reached, say a speed above 16 miles per hour, the switch 75, 84, Figure 1, is closed thereby again energizing the solenoid 63 thru the intermediary of the relay 92' to effect a high gear operation of the motor 51. The clutch motor 27' is, with this operation, again energized to disengage the clutch thereby facilitating this high gear operation of the transmission; and when this setting of the transmission is completed the switch 88, 93 is opened and the switch 85, 88 closed thereby de-energizing the motors 27' and 51 to engage the clutch and operate the alternator 55 to prepare the same for a subsequent second gear operation of the mechanism. The crank 14 is thus automatically moved back and forth to shuttle the transmission between its high and second gear settings the latter setting being effected in the operation of bringing the car to a stop. The aforementioned breaker switch 55' may be included in the electrical connection between the accelerator operated switch 78 and the contact 75 of the governor operated switch 76 said breaker switch being closed by the piston 67 of the motor 51 when said piston is in its released, that is, motor de-energized position. Explaining the operation of the switch 55' should the driver suddenly apply his brakes to reduce the speed of the vehicle below governor speed as the high gear operation of the transmission is being effected then the motor 51, by virtue of the presence of the switch 55', will be automatically again energized to establish the transmission in its second gear setting when the piston 67 is moved to close the switch 55'. This unusual operation of the mechanism may be termed a recycle operation.

It will now be assumed that the car is at a standstill with the motor idling and that the transmission is established in its second gear setting; and it will also be assumed that the driver wishes to again manually operate the transmission; for example, he may wish to place the transmission in low gear. To accomplish this end the driver will move the shift lever 24 out of its high gear position thereby rotating the crank 42 counterclockwise, Figure 1, and breaking the switch 96 to effect a spring energization of the spring and pressure differential operated latch motor 41. In effecting this operation the three pole single throw switch 124 mechanism is operated to both open the switch 96 and close the switches 99 and 123 of said mechanism. Preferably the switch 123 and the mechanism for operating the same are so constructed that the shift lever must be moved a certain distance before the switch 123 is closed; and this construction prevents an undesired clutch disengaging operation of the motor 27' when the driver merely rests his hand upon the gear shift lever; for to close the switch 123 to effect disengagement of the clutch the driver must apply an appreciable force upon the shift lever.

Continuing the description of the operation of the mechanism a return spring 100 within the motor 41 then expands to rotate the lever 46 in a clockwise direction, Figure 1, and when the latch 48 is about to enter the recess 50, that is when the latch 48 is in a position contacting or just about to contact the face 119 of the crank 52, the breaker switch 101 is closed thereby completing an electrical circuit to energize the lock-in relay coil 91'. The motor 51 is accordingly again energized to rotate the crank 52 in a clockwise direction, Figure 1, to expedite the operation of meshing the latch 48 in the recess 50. In this operation the crank 52 and crank 42 with the latch 48 secured thereto, rotate towards each other assuming of course that the clockwise rotation of the crank 52 is initiated before the latch member 48 is moved all the way to its second gear position.

Now it will be remembered that the switch 92 is closed shortly after the face 49' of the latch 48 contacts or is about to contact the face portion 119 of the crank 52; and it will also be remembered that the switches 101 and 92 remain closed for a short period of time as the latch 48 is entering the recess 50. This operation of the electrical controls, that is the operation occurring during the re-establishing of the manual operation of the transmission, serves to cut off the electrical connection between the solenoid 63 and the battery 81. It is also apparent that in this operation the motor 51 is de-energized in sufficient time to prevent its impeding the operation of manually establishing the transmission in its second gear setting and before the piston 67 has moved to its high gear position.

There is thus provided, by the spring and pressure differential operated latch motor 41, the breaker switches 92 and 101 operated by said motor, and the three pole single throw switch 124, power means cooperating with the remainder of the mechanism to effect either a power operation of the transmission to establish the same in its second and high gear settings or to effect a manual operation of the transmission, the change-over from the power operation to the manual operation being expedited by the above described operation of the latch motor. With the latter operation the crank 52 and the latch 48 move toward each other, either in the same or opposite direction, to expedite the interconnecting of these parts of the mechanism. As is disclosed in Figure 2 the switches 92 and 101 may be housed in a suitable container A conveniently mounted say upon the chassis of the vehicle, and this compacting of the controls will facilitate the servicing of the mechanism of my invention. Likewise the relay 92' and switches 45', 55', 78, 87, 88' and 125 may be housed within a container B; and the shift lever operated switches 96, 99, and 123 may be housed within a container indicated by the letter C.

Describing now the complete operation of the mechanism of my invention and incidentally completing the description of the parts of said mechanism not heretofore described, it will be assumed that the vehicle is at a standstill, the switches 78 and 79 are closed, the engine is idling, and the shift lever 24 is in its high gear position to make possible a power operation of the transmission; and under these conditions the transmission will be established in its second gear setting. Explaining the operation of the mechanism to effect this second gear setting, the switches 78, 79, and 80, the switch 85, 88 and the switch 75, 83 are closed as the vehicle is being decelerated to a stop, the latter switch 75 being closed at a certain critical speed. The solenoid 63 is then energized to open the valve 60 and this results in an energization of the motor 51 to effect the second gear setting of the transmission, the electrical circuit including said switches being automatically opened, by the opening of the switch 45', just after the setting of the transmission is completed; and in effecting this second gear operation of the transmission the motor 27' is energized to disengage the clutch thereby facilitating the operation of the transmission.

Explaining this operation in greater detail it is to be remembered that the selector switch 88, 85 is closed when the transmission is established in its high gear setting this operation being effected to prepare the mechanism for a low gear operation of the mechanism; and it is also to be remembered that the governor switch 75, 83 is automatically closed, to initiate the second gear operation of the mechanism, when the speed of the vehicle is brought down to a certain factor.

With the opening of the latter circuit the piston 67 of the motor 51 returns to its transmission engaged position and with this operation the switch 86, 88 is closed and the crank 72 of the alternator is returned to its preselecting position. The mechanism is then prepared for a subsequent power operated high gear operation of the transmission. As to the above described second gear operation of the mechanism, it is to be remembered that the clutch is power operated to facilitate the operation of the transmission.

The transmission being established in its second gear setting, the driver, to get the vehicle under way, will then depress the accelerator; and this operation in getting the vehicle under way in second gear is facilitated by the operation of the clutch controlled in part by the crank 24'. This clutch, which may be of the centrifugal and spring operated type or the fluid type, cooperates with the transmission to effect the desired acceleration of the vehicle. When the speed of the vehicle exceeds governor speed the switch 75, 84 of the governor switch 76 will be automatically closed and then when the driver releases the accelerator to close the throttle and close the switch 78 there will be effected another energization of the motors 27' and 51 to disengage the clutch and effect a high gear setting of the transmission. As the high gear setting is being completed switch 88, 93 is opened thereby again initiating the return of the pistons 67 and 121 to their released positions. If the driver releases the accelerator to close the switch 78 and then immediately re-opens said switch by reversing the direction of movement of the accelerator and before a vacuum energization of the motor 51 is initiated, then the latter operation of the accelerator serves to de-energize the coil 91' to prevent an undesired operation of the transmission when the accelerator is subsequently released with the vehicle traveling at a high speed.

The transmission will then be shuttled back and forth between its second and high gear settings depending upon the speed of the vehicle the clutch being operated to facilitate these power operations of the transmission. In this operation one or the other of the motor operated selector switches 85, 88 and 86, 88 is made just as the transmission is being established in gear thereby preparing the mechanism for a subsequent operation of the transmission; and said operation is then initiated by the operation of the governor switch 76.

Should the driver then desire to effect a manual operation of the transmission aided by the power operation of the clutch, he will move the shift lever out of its high gear position thereby effecting an operation of the spring and pressure differential operated latch motor 41 and the transmission operating pressure differential operated motor 51 to interconnect the shift lever with the transmission operating crank 14; and thereafter the transmission may be completely manually operated. It is however undesirable to effect this manual operation of the transmission by overruling the motor 51 when the vehicle is traveling above a certain speed; accordingly, to this end there is provided a vehicle speed responsive governor operated switch 125' in the electrical circuit including the series connected switches 78, 55', 99, and 101. The switch 125' may, if desired, be supplanted by the governor operated switch of a conventional overdrive mechanism incorporated in many of the cars of the day. Above a certain vehicle speed, say 35 miles per hour, the switch 125' is opened thereby temporarily disabling the motor 51 and consequently making it impossible to operate the latch mechanism 38 to interconnect the gear shift lever and transmission. If desired, however, the switch 125' may in turn be overruled to effect a manually operated second gear setting of the transmission at any vehicle speed by incorporating, in parallel with the switch 125', a clutch pedal operated switch 126. The driver, to effect a manual operation of the transmission above governor speed, will then depress the clutch pedal to close the switch 126 whereupon he will then operate the shift lever to place the transmission in its second gear setting.

Although only one embodiment of the invention has been illustrated and described, various changes in the form and relative arrangements of the parts may be made to suit requirements.

I claim:

1. Power and manually operated means for operating a three speeds forward and reverse transmission of an automotive vehicle including a gear shift lever, force transmitting means, including a latch mechanism, interconnecting the shift lever and transmission, power means for operating the transmission to establish the same in two of its settings, force transmitting means interconnecting the transmission and power means, means for operating the latch mechanism to disconnect the shift lever from the transmission when the shift lever is placed in a certain setting, and means, including a lock-in relay mechanism, for controlling both the latch operating mechanism and the transmission operating power means whereby the latter is automatically operative to shuttle the transmission between its second and third gear settings and the latch mechanism is quickly operated to make possible either a manual operation of the transmission or the aforementioned power operation thereof.

2. Power and manually operated means for operating a three speeds forward and reverse transmission of an automotive vehicle including a gear shift lever, force transmitting means, including a latch mechanism, interconnecting the shift lever and transmission, power means, including a single acting pressure differential operating motor, for operating the transmission to establish the same in two of its settings, force transmitting means, including a direction changing mechanism, interconnecting the transmission and power means, means, including a single acting spring and pressure differential operated motor, for operating the latch mechanism to disconnect the shift lever from the transmission when said lever is placed in a certain setting, and means, including a lock-in relay mechanism, for controlling both the latch operating mechanism and the transmission operating power means whereby the latter is automatically operative to shuttle the transmission between its second and third gear settings and the latch mechanism is quickly operated to make possible either a manual operation of the transmission or the aforementioned power operation thereof.

3. The combination with a change speed transmission and a friction clutch of an automotive vehicle, of manually and power operated means for operating the transmission and clutch including a gear shift lever, power means for operating the transmission, power means for operating the clutch, force transmitting means interconnecting the clutch and the latter power means, force transmitting means, including a latch mechanism, interconnecting the shift lever and transmission, force transmitting means interconnecting the transmission operating power means and the transmission, power means, controlled in part by an operation of the shift lever, for operating the latch mechanism, said latch mechanism being operative to disconnect the shift lever from the transmission when the latter is being power operated; and means for controlling the operation of all three power means including means, operated by the latch mechanism operating power means, and operative to effect a momentary energization of the transmission operating power means to expedite the operation of the latch mechanism in its operation of reconnecting the gear shift lever with the transmission.

4. Power and manually operated means for operating the three speeds forward and reverse transmission of an automotive vehicle including a manually operated gear shift lever, force transmitting means, including a latch mechanism, interconnecting said lever and transmission, power means for operating the transmission to alternately establish the same in first one and then the other of two of its settings, force transmitting means interconnecting said power means with a part of the transmission, power means for operating the latch mechanism to disconnect the shift lever from the transmission when the same is being power operated, and means for controlling the operation of both power means including a lock-in relay mechanism for controlling the operation of the transmission operating power means and further including control means, operated by the latch operating power means, for momentarily energizing the transmission operating power means to facilitate the operation of the latch mechanism in its operation of reconnecting the shift lever with the transmission.

5. The combination with a friction clutch and a three speeds forward and reverse transmission of an automotive vehicle, of power and manually operated means for operating the transmission and clutch including a manually operable shift lever, transmission operating force transmitting means interconnecting the lever and transmission including force transmitting means connected to the transmission, power means connected to a latter force transmitting means and operable to establish the transmission in a plurality of settings, power means for operating the clutch, means, including a lock-in relay mechanism, for controlling the operation of both power means, force transmitting means connected to the shift lever, a latch mechanism interconnecting the latter force transmitting means and the force transmitting means connected to the transmission and operable to disconnect the shift lever from the transmission when the latter is being power operated, and means controlled by an operation of the shift lever, for operating the latch mechanism.

6. The combination with a friction clutch and a three speeds forward and reverse transmission of an automotive vehicle, of power and manually operated means for operating the transmission and clutch including a manually operable shift lever, transmission operating force transmitting means interconnecting the shift lever and transmission including force transmitting means connected to the transmission, power means, including a single acting motor, connected to the latter force transmitting means and operable to establish the transmission first in one and then the other of two of its two settings, power means for operating the clutch, electrical means, including a lock-in relay mechanism, for controlling the operation of both power means, force transmitting means connected to the shift lever, a latch mechanism interconnecting the latter force transmitting means and the force transmitting means connected to the transmission, and means controlled in part by an operation of the shift lever, for operating the latch mechanism.

7. The combination with a friction clutch and a three speeds forward and reverse transmission of the power plant of an automotive vehicle, of power and manually operated means for operating the transmission and clutch including a manually operable shift lever, transmission operating force transmitting means interconnecting the lever and transmission including force transmitting means connected to the transmission, power means, including a single acting motor, connected to a latter force transmitting means and operable to establish the transmission first in one and then the other of two of its two settings, power means for operating the clutch, means, including a lock-in relay mechanism, for controlling the operation of both power means, force transmitting means connected to the shift lever, a latch mechanism interconnecting the latter force transmitting means and the force transmitting means connected to the transmission, and means, including a spring and pressure differential operated motor, controlled in part by an operation of the shift lever, for operating the latch mechanism.

8. The combination, in the power plant of an automotive vehicle, of a friction clutch and a three speeds forward and reverse transmission; of power and manually operable means for operating the clutch and transmission including a gear shift lever, force transmitting means interconnecting the lever and transmission including a latch mechanism operative to disconnect the transmission and shift lever when the latter is placed in a certain position, means for operating the latch mechanism, power means for operating the transmission to shuttle the same between two of its settings, power means for operating the clutch, and means, including electrical means, for controlling the operation of both power means and the latch operating means, said electrical means including a lock-in relay mechanism operative to facilitate the operation of the power means once the operation of the transmission and clutch is initiated.

9. The combination, in the power plant of an automotive vehicle, of a friction clutch and a three speeds forward and reverse transmission; of power and manually operable means for operating the clutch and transmission, including a gear shift lever, force transmitting means interconnecting the lever and transmission including a latch mechanism operative to disconnect the transmission and shift lever when the latter is in a certain position, power means, including a spring and pressure differential operated motor, for operating the latch mechanism, power means for operating the transmission to shuttle the same between two of its settings, power means for operating the clutch; and means, including electrical means, for controlling the operation of the several power means, said electrical means including a lock-in relay mechanism operative to facilitate the operation of the power means once the operation of the clutch and transmission is initiated.

10. Power and manually operated means for operating the three speeds forward and reverse transmission of an automotive vehicle and for operating a friction clutch of the vehicle to facilitate an operation of the transmission; said means comprising a manually operated gear shift lever, transmission operating force transmitting means, including a latch mechanism, interconnecting the shift lever and transmission said latch mechanism serving to disconnect a part of the transmission from the gear shift lever when the latter is positioned in a certain position, power means for operating the aforementioned certain part of the transmission, power means for operating the clutch, power means for operating the latch mechanism, and means, including electrical means, comprising a lock-in relay mechanism, for controlling the operation of the three power means, said electrical means further including means actuated by the last mentioned power means and operative to control the operation of the first mentioned power means.

11. Power and manually operated means for operating a three speeds forward and reverse transmission of an automotive vehicle and for operating a friction clutch of the vehicle to facilitate an operation of the transmission, said means comprising a manually operated gear shift lever, transmission operating force transmitting means, including a latch mechanism, interconnecting the shift lever and transmission said latch mechanism serving to disconnect a part of the transmission from the gear shift lever when the latter is positioned in a certain position, power means, including a single acting pressure differential operated motor, for operating the aforementioned certain part of the transmission; power means, including a single acting motor, for operating the clutch; power means, including a single acting motor, for operating the latch mechanism; and means, including electrical means for controlling the operation of the three power means said electrical means including means actuated by the last mentioned power means and operative to control the operation of the first mentioned power means.

12. Power and manually operated means for operating the transmission of an automotive vehicle including a gear shift lever, force transmitting means, including a latch mechanism, interconnecting said lever and transmission, the latch, when operated, serving to disconnect the lever from the transmission when the latter is being power operated, power means for operating the transmission to alternately establish the same in its second and high gear settings, power means, including a spring and pressure differential operated motor, for operating the latch mechanism and for in part controlling the operation of the aforementioned power means, and electrical means for controlling the operation of both power means including a lock-in relay mechanism operative to insure a completion of the operation of the first mentioned power means once its operation is initiated.

13. Power and manually operated means for operating the transmission of an automotive vehicle including a gear shift lever, a clutch pedal and an accelerator; force transmitting means, including a latch mechanism, interconnecting said lever and transmission the latch when operated, serving to disconnect the lever from the transmission when the latter is being power operated, power means for operating the transmission to alternately establish the same in its second and high gear settings, power means including a spring and pressure differential operated motor, for operating the latch mechanism and for in part controlling the operation of the aforementioned power means, and electrical means for controlling the operation of both power means including a lock-in relay mechanism operative to insure a completion of the operation of the first-mentioned power means once its operation is initiated and further including an accelerator operated breaker switch for effecting a de-energization of the first mentioned power means when the accelerator is depressed to a certain position, a governor operated switch operative to control the operation of the latter power means, and a clutch pedal operated switch also operative to control the operation of the latter power means.

14. Manually and power operated means for operating a three speeds forward and reverse transmission and a friction clutch of an automotive vehicle comprising a pressure differential operated motor, force transmitting means interconnecting the power element of the motor with the transmission, another pressure differential operated motor, force transmitting means interconnecting the latter motor with the clutch, manually operated force transmitting means, including a latch mechanism, connected with the transmission and operative to effect a manual operation of a part of the transmission when the transmission operating power means is disabled, power means, including a motor and motor controlling valve means, for operating the latch means, valve means for controlling the operation of the clutch and transmission operating motors, and electrical means for controlling the operation of the three valve means including electrical means for controlling the operation of the latter valve means to effect an operation of the transmission and clutch operating motors to disengage the clutch and operate the transmission and then re-engage the clutch, said electrical means including, in series parallel circuit relationship, a switch adapted to be closed when the accelerator of the vehicle is released and opened when the accelerator is depressed, a governor operated switch mechanism, a selector switch mechanism operated by the first mentioned motor, the coil of a lock-in relay mechanism, and a grounded motor operated switch, for operating the transmission motor controlling valve means, said governor and motor operated switch mechanism cooperating to make an electrical circuit to effect an energization of the motor and then automatically break said circuit to de-energize the motor after the transmission is established in gear.

EDWIN E. PRATHER.

No references cited.